(12) United States Patent
Wode

(10) Patent No.: US 6,336,610 B1
(45) Date of Patent: Jan. 8, 2002

(54) COMPRESSED-AIR LANDING STRUT AND METHOD FOR ITS MANUFACTURE

(75) Inventor: Stefan Wode, Langenhagen (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 09/359,667

(22) Filed: Jul. 26, 1999

(30) Foreign Application Priority Data

Jul. 29, 1998 (DE) .......................................... 198 34 092

(51) Int. Cl.[7] .............................................. B64C 25/00
(52) U.S. Cl. ............................ 244/100 R; 188/322.16; 267/64.19
(58) Field of Search ..................... 188/322.16, 322.19; 267/64.19, 64.23, 64.24, 64.27, 122

(56) References Cited

U.S. PATENT DOCUMENTS

| | | | | |
|---|---|---|---|---|
| 4,575,115 A | * | 3/1986 | Tatemoto et al. | 280/707 |
| 4,647,025 A | * | 3/1987 | Gold | 267/64.27 |
| 4,697,797 A | * | 10/1987 | Gold | 267/64.24 |
| 5,346,187 A | * | 9/1994 | Drescher | 267/64.11 |
| 5,413,316 A | * | 5/1995 | Easter | 267/64.24 |
| 5,518,225 A | * | 5/1996 | Gubitz | 267/64.24 |
| 5,575,360 A | * | 11/1996 | Gubitz et al. | 188/298 |
| 5,636,831 A | * | 6/1997 | Gubitz | 267/64.24 |
| 5,649,691 A | * | 7/1997 | Handke et al. | 267/64.21 |
| 5,667,206 A | * | 9/1997 | Romer | 267/64.23 |
| 5,669,597 A | * | 9/1997 | Rittstieg et al. | 267/64.17 |
| 5,707,045 A | * | 1/1998 | Easter | 267/64.21 |
| 6,161,662 A | * | 12/2000 | Johnston et al. | 188/282.3 |

FOREIGN PATENT DOCUMENTS

| | | |
|---|---|---|
| DE | 44 28 601 | 2/1996 |
| DE | 195 08 980 | 6/1996 |
| DE | 19508852 | 8/1996 |
| DE | 195 22 459 | 10/1996 |

* cited by examiner

*Primary Examiner*—Peter M. Poon
*Assistant Examiner*—Kevin Jakel
(74) *Attorney, Agent, or Firm*—Smith, Gambrell & Russell, LLP

(57) ABSTRACT

A compressed air landing strut 2 is disclosed with a pneumatic shock absorber which is set onto a spring support 14. The spring support 14 has an offset 22 and the end region 24 of the roll-off piston 12 is flared radially outward, so that it surrounds the offset 22. An O-ring 24 is radially compressed between the outer wall 40 of the spring support 14 and the inner wall 42 of the roll-off piston 12 and seals the spring space 4 of the pneumatic shock absorber air-tight against the environment. A method for the manufacture of said pneumatic shock absorber is also disclosed.

9 Claims, 3 Drawing Sheets

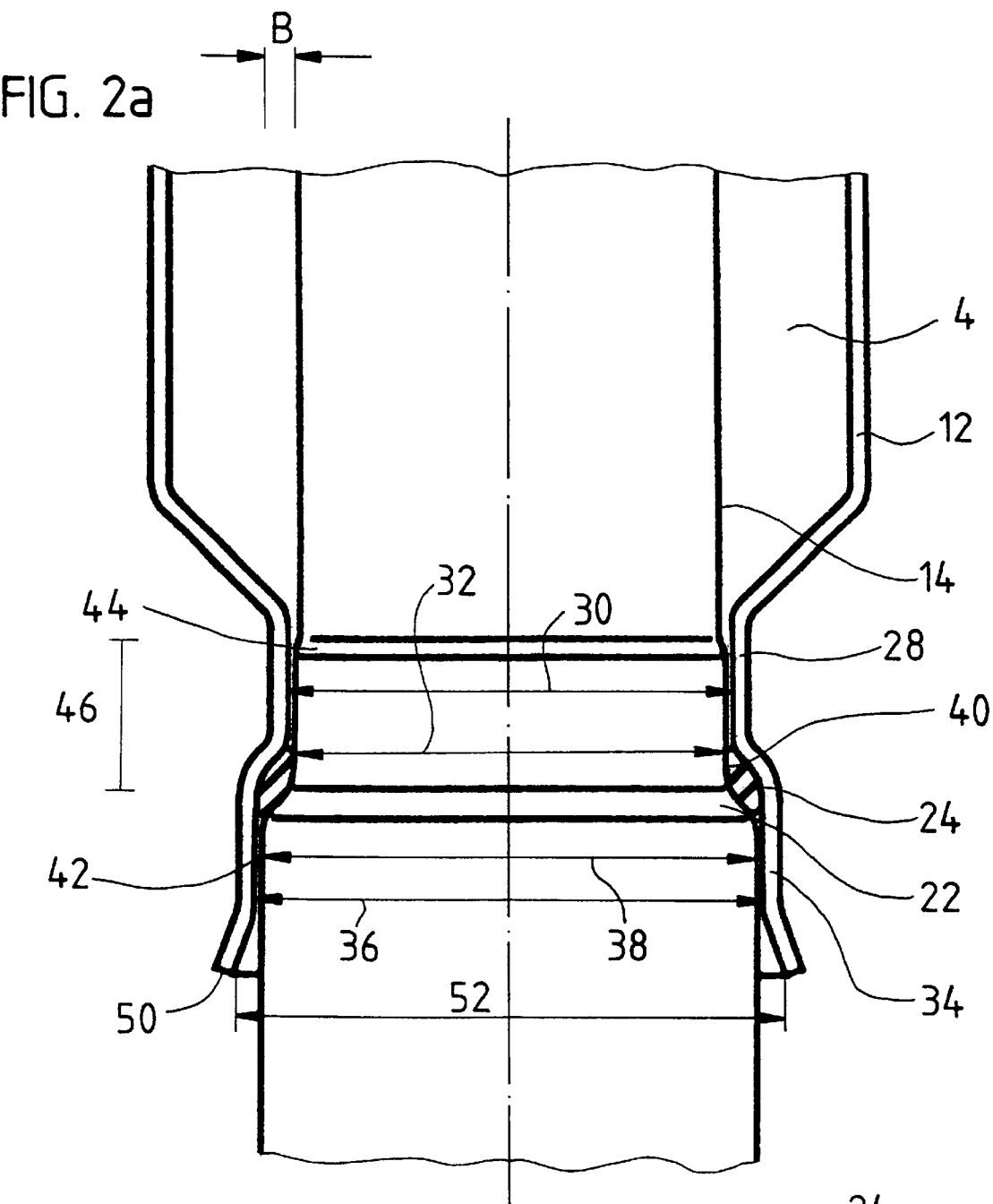
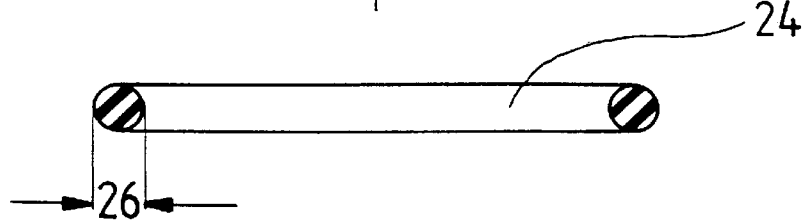

COMPRESSED-AIR LANDING STRUT AND METHOD FOR ITS MANUFACTURE

INTRODUCTION AND BACKGROUND

The present invention pertains to a compressed air landing strut which contains the following components:

- a pneumatic shock absorber with rolling bellows which enclose a spring space
- a roll-off piston along which the rolling bellows can roll
- a spring support that is immersed in the roll-off piston, with an offset in which the roll-off piston is braced
- a ring-shaped gasket which is located between the spring support and the roll-off piston and seals the spring space against the environment.

A compressed air landing strut of the kind specified above is known, for example, from German 44 28 601 A1. The compressed air landing strut contains a pneumatic shock absorber with an outer tube which, together with a rolling bellows and a roll-off piston, surrounds a spring space. The roll-off piston of the pneumatic shock absorber is braced on an offset of the spring support, which can be designed, for example, as a shock absorber. Above the offset of the spring support there is a groove in the inner wall of the roll-off piston, in which a ring-shaped gasket is installed between the spring support and the roll-off piston, which seals the spring space surrounded by the pneumatic shock absorber air tight against the environment.

German 44 28 601 A1 does not indicate specifically how the sealing is established between the spring support and the roll-off piston. However, from German 195 22 459 C1 by the same applicant, it is known how to make the ring-shaped groove between the spring support and the roll-off piston accessible from outside the roll-off piston to fill it with a shapeable sealing material from the outside via an injection opening, which rests on one side against the roll-off piston and on the other side against the spring support.

The compressed air landing strut known from German 44 28 601 A1 and from German 195 22 459 C1 has a dependable sealing of the pneumatic shock absorber against the environment. However, it is evident that the compressed air landing strut known from the aforementioned publications must first be fully assembled; the seal between the spring support and the roll-off piston can only be established thereafter. To this extent, the manufacturing method of the compressed air landing strut according to German 44 28 601 A1 or according to German 195 22 459 C1 can be considered to be complicated.

From DE 195 08 980 C1 is known a compressed air landing strut with a pneumatic shock absorber whose roll-off piston is braced in a tumbler movement against a telescoping shock absorber. To do this, a flange-like collar is set onto the outer tube of the telescoping shock absorber, on which a ring part of elastomer material is placed. The end region of the roll-off piston facing the outer tube of the telescoping shock absorber is likewise designed as a flange-like collar, and is set onto the elastomer ring part. The collars preferably have the shape of a spherical segment.

Due to the explained attachment of the roll-off piston to the outer tube of the telescoping shock absorber, a tumbler movement of the roll-off piston is ensured. However, we find that to ensure this tumbler movement, the flange-like collar must have a significantly larger diameter than the outer tube of the telescoping shock absorber. In order to avoid an adverse impact on the axial stability of the outer tube of the telescoping shock absorber, the flange-like collar is thus designed as a separate component. This requires a separate sealing of the flange-like collar against the environment. In addition, the ring part must have a complicated shape in order to ensure sufficient sealing of the spherical-segment-shaped collar. It is thus expensive to manufacture. For the reasons stated above, the attachment of the pneumatic shock absorber to a spring support known from German 195 08 980 C1 has only limited applicability.

It is therefore an object of the invention to create an attachment of a pneumatic shock absorber to a spring support which is easy to manufacture and which will ensure a reliable sealing of the space enclosed by the pneumatic shock absorber against the environment.

SUMMARY OF THE INVENTION

The above and other objects of the present invention can be achieved by a compressed air landing strut which contains the following components:

- a pneumatic shock absorber with a rolling bellows which encloses a spring space,
- a roll-off piston along which the rolling bellows can roll,
- a spring support that is plunged into the roll-off piston, with an offset in which the roll-off piston is braced,
- a ring-shaped gasket which is located between the spring support and the roll-off piston, and seals the spring space against the environment,
- and where on the offset of the spring support there is an O-ring whose cross sectional surface diameter is sized so that it covers at least the width of the offset, and further that
- the end region of the roll-off piston facing the spring support is flared radially outward, and that
- the spring support is plunged into the roll-off piston in such a manner that the end region of the roll-off piston, flared radially outward, surrounds the offset of the spring support, and the O-ring is compressed radially between the outer wall of the spring support and the inner wall of the end region of the roll-off piston.

Preferably, the cross-sectional surface diameter of the O-ring in the unstressed state of the O-ring is greater than the width of the offset, in order to ensure a good radial compression of the O-ring. Typically, the cross-sectional surface of the O-ring (i.e., the cord thickness) will have a diameter of 2 mm to 8 mm and the width of the offset amounts to about 60% to 80% of the selected cord thickness (at a cord thickness of 5 mm, the width of the offset is thus 3 mm to 4 mm, so that the O-ring will be compressed radially by 1 mm to 2 mm).

BRIEF DESCRIPTION OF DRAWINGS

The present invention will be further understood with reference to the drawings, wherein:

FIGS. 2a and 2b are partial sectional views of a part of the device of FIG. 1.

DETAILED DESCRIPTION OF INVENTION

Figure 1:
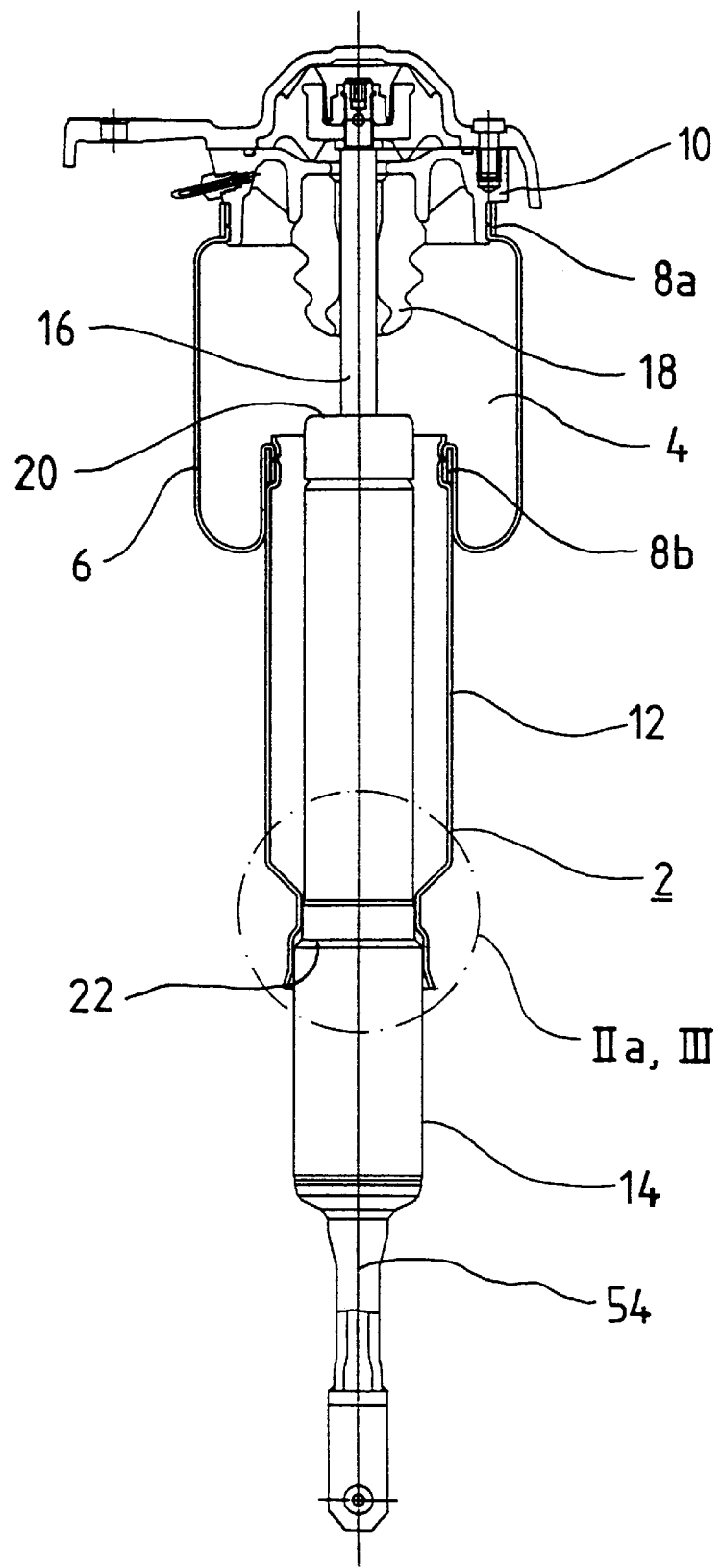
FIG. 1 schematically represents a section elevation view of a compressed air landing strut according to the present invention.

The advantages achieved with the present invention can be seen, in particular, by the fact that the attachment of the roll-off piston to the spring support is established in a simple manner, since we need merely an easily manufactured O-ring, available as an off-the-shelf part, which is placed on the offset of the spring support. In addition, due to the radial compression of the O-ring between the outer wall of the spring support and the inner wall of the roll-off piston, an air-tight seal against the environment is ensured for the spring space surrounding the pneumatic shock absorber. An additional advantage of the invention is that both the outer wall of the spring support in the region of the recess, and also the end region of the roll-off piston facing the spring support, can have certain manufacturing tolerances, since these are compensated by the high radial compression of the O-ring, and thus the air-tight sealing of the spring space against the environment is not adversely affected. Thus, a low-cost manufacture is possible, both for the spring support and the roll-off piston. An additional advantage of the invention is seen in the fact that the offset, on which the O-ring is placed, need have only a small width. For this reason, the axial stability of the spring support is adversely affected only to a negligible extent by the offset. Finally, another advantage of the invention is that a sufficient axial bracing of the roll-off piston against the offset of the spring support is ensured, even though the O-ring is located between the offset of the spring support and the inner wall of the roll-off piston.

According to one design example relating to a detailed aspect of the invention, the roll-off piston and the spring support are formed essentially rotation-symmetrical to their longitudinal axis, and the inner wall diameter of the end region of the roll-off piston essentially corresponds to the maximum outer wall diameter of the offset of the spring support. The advantage of this design example is due to the fact that in a rotation-symmetrical roll-off piston and spring support, the end region or the offset is particularly easy to manufacture.

In to another embodiment of the invention, the spring support has a stop above the recess, on which the O-ring is placed before mounting of the roll-off piston to the spring support. The advantage of this refinement is due to the fact that, during the assembly of the roll-off piston on the spring support, the O-ring will be able to roll from the stop to the recess. Any damage of the O-ring due to sliding of the roll-off piston past the O-ring is thus prevented during the assembly of the roll-off piston on the spring support.

In another embodiment of the invention, the spacing between the stop and the offset is slightly less than a whole-number multiple of the circumference of the cross sectional surface area of the O-ring. The advantage of this refinement can be seen in the fact that, during the assembly of the roll-off piston onto the spring support, the O-ring will not make a whole-number of rotations during the roll-off. Rather, the O-ring will come to rest against the offset just shortly before completion of a final rotation. Since the O-ring tends, due to its internal stresses, to complete the "last" rotation, the radial compression of the O-ring against the seat will be enhanced, and there will be a kind of "snap in."

In another more detailed embodiment of the invention, the spring support has a reduced shank diameter directly above the offset in which the O-ring rests. The advantage of this refinement can be seen in the fact that the elastically deformable O-ring is installed in this reduced shank diameter under a radial tapering, which likewise leads to support of the radial compression of the O-ring.

In a further more detailed embodiment of the invention, the offset in the spring support is designed as a ridge. The advantage of this refinement is seen in the fact that this kind of ridge can be supplied from the inside by radial flaring of a tubular spring support.

A still further embodiment of the invention, provides that the end of the roll-off piston facing the spring support has an inner wall diameter which is far larger than that of the outer wall diameter of the offset, and the inner wall diameter of the end is tapered in the end region of the roll-off piston at the outer wall diameter of the recess. The advantage of this refinement is seen in the fact that this kind of "tulip-shaped" formation of the end region will simplify an assembly of the roll-off piston on the spring support.

Referring to the accompanying drawings, FIG. 1 presents a schematic illustration of a compressed air landing strut 2, which has a generally known design. The compressed air landing strut 2 contains a pneumatic shock absorber with a rolling bellows 6, which is attached by means of an attaching element 8a to the upper cover 10, and by means of an attaching element 8b to a roll-off piston 12. The pneumatic shock absorber surrounds a spring space 4, which can be supplied with compressed air from a compressed air connector (not shown). The roll-off piston 12 is set onto a spring support 14 and is braced in the axial direction of the compressed air landing strut 2 against the offset 22. In this regard, the roll-off piston 12 has essentially the same perimeter contour directly above the offset 22, as the spring support 14 above the offset 22. The spring support 14 is designed as a container tube in the illustrated design example, in which a shock absorber is located in a known manner. The shock absorber has a piston rod 16 which is mechanically connected to the upper cover 10 of the pneumatic shock absorber. During an up stroke of the compressed air landing strut 2, the piston rod 16 is pulled out from the shock absorber or is plunged into it, and thus damps the vibrations occurring in the pneumatic shock absorber. The piston rod 16 is surrounded concentrically by a buffer 18 at its end, facing the upper cover 10; said buffer rests on the end cap 20 of the shock absorber during larger up-strokes of the compressed air landing strut 2.

Preferably, the roll-off piston 12 and the spring support 14 are formed rotation-symmetrical to the longitudinal axis 54 of the compressed air landing strut 2, as is also indicated in FIG. 1. The width B of the offset is obtained from the difference of the outer wall diameter 32 of the spring support 14 above the offset 22 from the outer wall diameter 38 of the spring support 14 below the offset 22 (see also FIG. 2).

In conjunction with FIG. 2, which presents an enlarged bounded section in FIG. 1, it is now clear how the roll-off piston 12 is set onto the spring support 14. The spring support 14 has an offset 22 on which an elastically deformable O-ring 24 is set; this O-ring is manufactured preferably from standard elastomers, such as NBR or EPDM, and its cross sectional surface diameter 26 in the unloaded state is sized so that it at least covers the width B of the offset 22 (see also FIG. 2b, which shows an unloaded O-ring 24). Preferably the cross sectional surface diameter 26 in the unloaded state of the O-ring 24 amounts to 2–8 mm, and the width B of the offset 22 amounts to 60–80% of the corresponding value. Any suitable synthetic elastomeric polymer can be used for the O-ring as will be understood by those skilled in the art.

The spring support 14 is plunged into the roll-off piston 12, and the roll-off piston 12 is braced axially against the offset 22 of the spring support 14. Thus, the roll-off piston 12 has an inner wall diameter 30 in a region 28 above the offset 22, which is essentially exactly as large as the outer wall diameter 32 of the spring support 14 above the offset 22. Above the region 28 (that is, in the direction of the rolling bellows 6; see FIG. 1), the roll-off piston 12 expands to a diameter which is clearly greater than the diameter of the spring support 14, so that an additional air volume is created between the roll-off piston 12 and the spring support 14.

Starting from the region 28, the end region 34 of the roll-off piston 12, facing the spring support 14, is flared radially outward, so that the inner wall diameter 36 of the end region 34 corresponds at least to the maximum outer wall diameter 38 of the offset 22. Preferably, the inner wall diameter 36 of the end region 34 is sized so that it essentially corresponds to the outer wall diameter 38 of the offset 22.

The O-ring 24 is compressed radially between the outer wall 40 of the spring support 14 and the inner wall 42 of the end region 34 of the roll-off piston 12, and thus seals the spring space 4 air-tight against the environment.

Above the offset 22 (in the direction of the rolling bellows 6) the spring support 14 has a stop 44 in the shape of an offset 22, on which the O-ring 24 is placed before assembly of the roll-off piston 12 on the spring support 14. The maximum outer wall diameter of the stop 44 corresponds to the minimum outer wall diameter of the offset 22 in the design example shown in FIG. 2, and the spring support 14 accordingly passes cylindrically from the stop 44 to the offset 22.

If the O-ring 24 before assembly of the roll-off piston 12 on the spring support 14 is set onto the stop 44, and if the spring support 14 is then introduced into the roll-off piston 12, then the O-ring will roll down against the outer wall 40 of the spring support 14 and on the inner wall 42 of the roll-off piston 12, until it assumes the end position shown in FIG. 2.

Preferably, the spacing 46 between the stop 44 and the offset 22 is slightly smaller than a whole-number multiple of the perimeter of the cross sectional surface area of the O-ring 24. The advantage of this kind of spacing is seen in the fact that with any roll-off of the O-ring 24 during assembly of the roll-off piston on the spring support 14, from the stop 44 to the offset 22, the O-ring cannot complete a final rotation. But since the O-ring "tries" to complete the final rotation, the radial pressing of the O-ring 24 against the offset 22 is enhanced.

Figure 3:
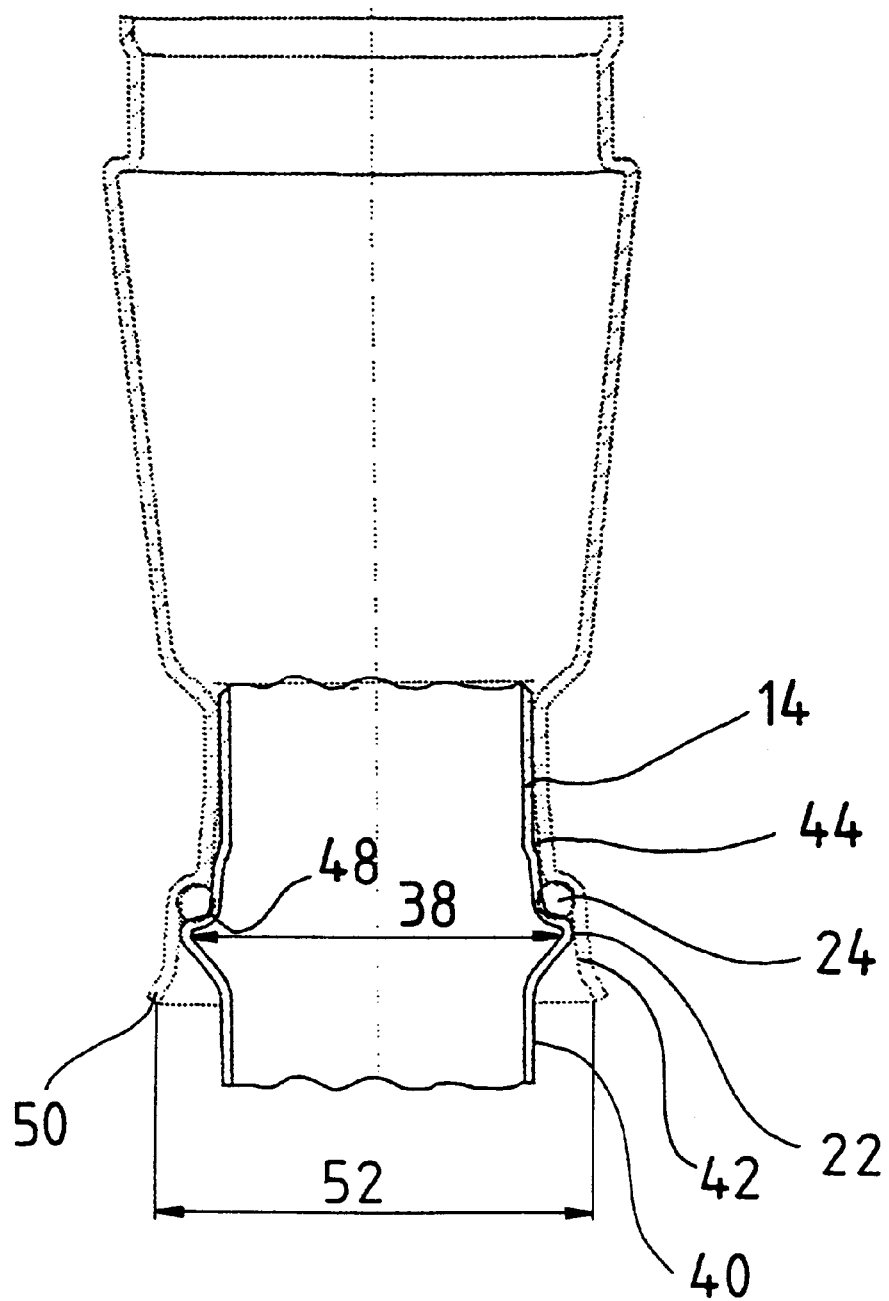
FIG. 3 is a partial sectional view of a part of the device of FIG. 1.

FIG. 3 likewise shows an enlarged section of a compressed air landing strut 2. FIG. 3 shows essentially the same thing as FIG. 2; one difference is that in FIG. 3, the spring support 14 is designed essentially as a cylindrical tube, in which the offset 22 is designed as a ridge 22. This kind of ridge 22 can be manufactured in a particularly simple way in a cylindrical-shaped tube, in which the tube is flared radially from inside to outside. The stop 44 can be designed in the same manner in the spring support 14 shown in FIG. 3.

Preferably, the spring support 14 has a reduced shank diameter 48 directly above the ridge 22 (viewed in the direction of the rolling bellows 6), in which the O-ring 24 rests. Due to the reduced shank diameter of the spring support 14 directly above the ridge 22, the radial compression of the O-ring 24 is supported between the inner wall 42 of the roll-off piston and the outer wall 40 of the spring support 14.

Both in the design example according to FIG. 2, and also in the design example according to FIG. 3, the end 50 of the roll-off piston 12 facing the spring support 14 has an inner diameter 52 which is clearly greater than the maximum outer diameter 38 of the offset 22, so that the end region 34 of the spring support 14 is of a "tulip-like" design. This kind of formation of the end of the roll-off piston 12 promotes the setting of the roll-off piston 12 onto the spring support 14.

Further variations and modifications of the foregoing will be apparent to those skilled in the art and are intended to be encompassed by the claims appended hereto.

German priority application 198 34 092.3 filed Jul. 29, 1998 is relied on and incorporated herein by reference.

LIST OF REFERENCE NUMBERS

2 Compressed air landing strut
4 Spring space
6 Rolling bellows
8a, b Attaching elements
10 Cover
12 Roll-off piston
14 Spring support
16 Piston rod
18 Buffer
20 End cap
22 Offset
24 O-ring
26 Cross sectional surface diameter
28 Region of the roll-off piston
30 Inner wall diameter of the roll-off piston
32 Outer wall diameter of the spring support
34 End region
36 Inner wall diameter of the end region
38 Outer wall diameter of the offset
40 Outer wall of the spring support
42 Inner wall of the roll-off piston
44 Stop
46 Spacing
48 Reduced shank diameter
50 End
52 Inner wall diameter of the end
54 Longitudinal axis of the compressed air landing strut

What is claimed is:

1. A compressed air landing strut comprising:
   a pneumatic shock absorber with a rolling bellows which encloses a spring space,
   a roll-off piston along which the rolling bellows can roll,
   a spring support that is plunged into the roll-off piston, with an offset in which the roll-off piston is braced,
   a ring-shaped gasket which is located between the spring support and the roll-off piston, and seals the spring space against the environment, wherein
   on the offset of the spring support there is the ring-shaped gasket in form of an O-ring whose cross sectional surface diameter is sized so that it covers at least the width of the offset, and that
   the end region of the roll-off piston facing the spring support is flared radially outward, and
   the spring support is plunged into the roll-off piston in such a manner that and the roll-off piston is braced in the axial direction against the offset, whereby the O-ring is located between the offset and the inner wall of the roll-off piston in such a manner, that the O-ring is compressed radially between the outer wall of the spring support and the inner wall of the end region of the roll-off piston.

2. The compressed air landing strut according to claim 1, further comprising that the roll-off piston and the spring support are formed essentially rotation-symmetrical to their longitudinal axis and that the inner wall diameter of the end region of the roll-off piston essentially corresponds to the maximum outer wall diameter of the offset of the spring support.

3. The compressed air landing strut according to claim 1, further comprising that the spring support has a stop above the offset, on which the O-ring is placed before mounting of the roll-off piston on the spring support.

4. The compressed air landing strut according to claim 3, wherein the spacing between the stop and the offset is slightly less than a whole-number multiple of the circumference of the cross sectional surface area of the O-ring.

5. The compressed air landing strut according to claim 1, wherein the spring support has a reduced shank diameter directly above the offset in which the O-ring rests.

6. The compressed air landing strut according to claim 1, wherein the offset in the spring support is a ridge.

7. The compressed air landing strut according to claim 1 further comprising that the end of the roll-off piston facing the spring support has an inner wall diameter which is far larger than that of the outer wall diameter of the offset and the inner wall diameter of the end is tapered in the end region of the roll-off piston at the outer wall diameter of the offset.

8. A method for the manufacture of a compressed air landing strut according to claim 1, comprising placing an O-ring is set onto the spring support, introducing the spring support into the roll-off piston in such a manner that the end region of the roll-off piston flared radially outward encloses the offset of the spring support and the O-ring comes to rest on the offset of the spring support, and is radially compressed between the outer wall of the spring support and the inner wall of the end region of the roll-off piston.

9. The method for the manufacture of a compressed air landing strut according to claim 8, further comprising that the O-ring is set onto a stop above the offset and upon introducing the spring support into the roll-off piston, the O-ring rolls off from the stop to the offset.

\* \* \* \* \*